United States Patent
Galluccio et al.

(10) Patent No.: US 11,801,734 B2
(45) Date of Patent: Oct. 31, 2023

(54) DEVICE FOR GUIDING A SLIDING GLASS OF A MOTOR-VEHICLE SIDE DOOR

(71) Applicant: FCA Italy S.p.A., Turin (IT)

(72) Inventors: Antonio Galluccio, Turin (IT); Eraldo Pignata, Turin (IT); Roberto Altobelli, Turin (IT)

(73) Assignee: FCA ITALY S.P.A., Turin (IT)

( * ) Notice: Subject to any disclaimer, the term of this patent is extended or adjusted under 35 U.S.C. 154(b) by 109 days.

(21) Appl. No.: 17/480,597

(22) Filed: Sep. 21, 2021

(65) Prior Publication Data

US 2022/0118829 A1   Apr. 21, 2022

(30) Foreign Application Priority Data

Oct. 21, 2020   (EP) .................................... 20203087

(51) Int. Cl.
*B60J 5/04* (2006.01)
*B60J 10/76* (2016.01)
(Continued)

(52) U.S. Cl.
CPC ............... *B60J 5/0402* (2013.01); *B60J 1/17* (2013.01); *B60J 10/76* (2016.02); *B60R 13/04* (2013.01)

(58) Field of Classification Search
CPC .......... B60J 5/0402; B60J 10/76; B60R 13/04
See application file for complete search history.

(56) References Cited

U.S. PATENT DOCUMENTS 1,609,926 A * 12/1926 Woodward ............... B60J 10/74
    49/440
4,910,914 A *  3/1990 Asoh ..................... E05F 11/382
    49/440
(Continued)

FOREIGN PATENT DOCUMENTS

FR        2759028 A1 *  8/1998 ................ B60J 1/17
FR        2847520 A1 *  5/2004 ................ B60J 1/17
(Continued)

OTHER PUBLICATIONS

Machine translation of FR-2847520; machine translation of FR 2759028.*
European Search Report dated Mar. 19, 2021.

*Primary Examiner* — Marcus Menezes
(74) *Attorney, Agent, or Firm* — Heslin Rothenberg Farley & Mesiti P C; Victor A. Cardona, Esq.

(57) ABSTRACT

A guiding device for a sliding glass of a side door of a motor-vehicle comprises a sealing and guiding gasket guiding the sliding glass, secured to the structure of the door, and having a part extending along a door upright and into the lower structure of the door. This gasket part comprises two separate portions, namely an upper gasket portion, which extends along the door upright and is secured within a space defined between the door upright and an aesthetic panel of plastic material; and a lower gasket portion, which is arranged within the lower door structure and is assembled within a channel element of plastic material mounted within the lower door structure. The channel element of plastic material has an upper end portion protruding above the upper end of the lower gasket portion, and having inclined inner surfaces configured to guide the insertion of the glass into the lower gasket portion during assembly of the door.

4 Claims, 13 Drawing Sheets

Figure 1:
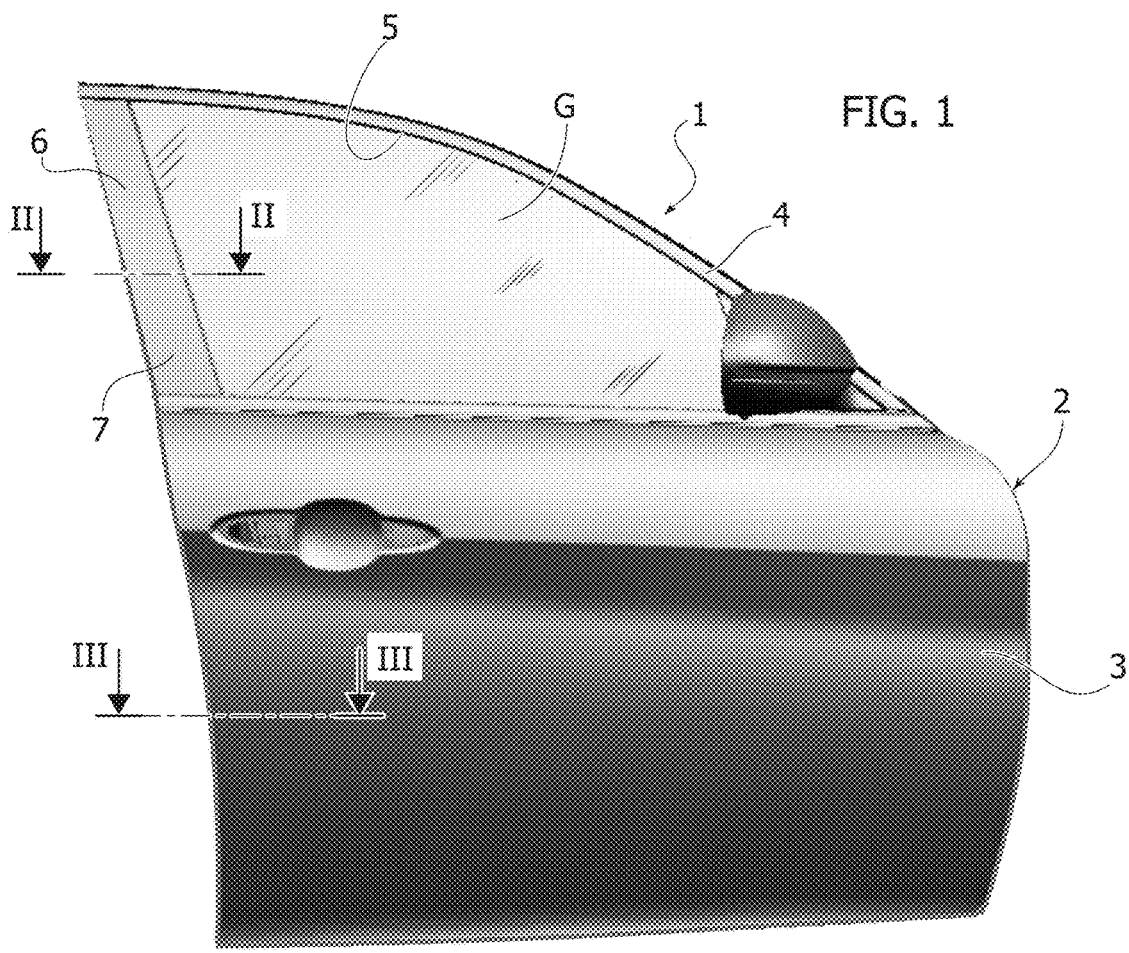

(51) Int. Cl.
  *B60J 1/17*   (2006.01)
  *B60R 13/04*  (2006.01)

(56)              References Cited

U.S. PATENT DOCUMENTS

| | | | |
|---|---|---|---|
| 10,611,223 B2* | 4/2020 | Nishikawa | B60J 10/16 |
| 2003/0089044 A1* | 5/2003 | Okahara | E05F 11/382 |
| | | | 49/416 |
| 2004/0150248 A1* | 8/2004 | Moreau | B60J 5/0406 |
| | | | 296/146.1 |
| 2004/0221512 A1* | 11/2004 | Hoffman | B60J 5/0408 |
| | | | 49/440 |
| 2008/0209814 A1* | 9/2008 | Tarjeft | B60J 5/0402 |
| | | | 49/415 |
| 2013/0160374 A1* | 6/2013 | Kuwabara | B60J 10/79 |
| | | | 49/440 |
| 2013/0292964 A1* | 11/2013 | Maass | B60J 5/0402 |
| | | | 49/482.1 |
| 2018/0022196 A1* | 1/2018 | Masumoto | B60J 5/0402 |
| | | | 49/428 |
| 2018/0117997 A1* | 5/2018 | Otake | B60J 5/0468 |
| 2018/0319260 A1* | 11/2018 | Krause | B60J 5/0402 |
| 2020/0307361 A1* | 10/2020 | Kracht | B60J 1/2097 |
| 2021/0347239 A1* | 11/2021 | Nolte | B60J 5/0402 |
| 2022/0161639 A1* | 5/2022 | Nolte | B60J 10/79 |

FOREIGN PATENT DOCUMENTS

| | | |
|---|---|---|
| FR | 3035034 A1 | 4/2015 |
| WO | 2018109061 A1 | 6/2018 |

\* cited by examiner

DEVICE FOR GUIDING A SLIDING GLASS OF A MOTOR-VEHICLE SIDE DOOR

CROSS REFERENCE TO RELATED APPLICATIONS

This application claims priority from European Patent Application No. 20203087.0 filed on Oct. 21, 2020, the entire disclosure of which is incorporated herein by reference.

FIELD OF THE INVENTION

The present invention relates to guiding devices for sliding glasses of motor-vehicle side doors, of the type comprising:
- a door structure, including a lower door structure and an upper frame defining a window opening,
- the upper door frame including a door upright which is to be adjacent to a central pillar (or "B" pillar) of the motor-vehicle,
- a sealing and guiding gasket guiding said sliding glass, secured to said door structure and having a portion extending along said door upright and inside the lower door structure,
- an aesthetic panel of plastic material, secured to said door upright, on an outer side thereof,
- a glass slidably mounted vertically within the door structure between a raised closed position in which it closes the window opening and a lowered position in which the glass is received within the lower door structure,
- wherein the glass has an inner surface carrying at least two spaced apart engagement elements, which are slidably engaged within said guiding and sealing gasket, in such a way that in the raised position of the glass, said glass has its outer surface that is flush with the outer surface of said aesthetic panel of plastic material.

PRIOR ART

A device for guiding a sliding glass having all the above characteristics is known, for example, from document WO 2016 174315 A1. Known solutions of this type have the drawback of requiring relatively complex and difficult operations for assembling the glass on the door structure.

OBJECT OF THE INVENTION

The object of the present invention is to overcome the aforesaid drawback.

In particular, one object of the invention is to provide a device for guiding a sliding glass wherein the assembling operation of the glass within the door structure is considerably simplified.

An additional object of the invention is that of producing a guiding device that enables the quality of the assembling operation to be improved, always ensuring that the glass is assembled in the correct position.

An additional object of the invention is to achieve the aforesaid objectives without making the structure of the motor-vehicle door more complex and expensive.

SUMMARY OF THE INVENTION

In view of achieving one or more of the aforesaid objects, the invention relates to a device for guiding a sliding glass of a motor-vehicle side door having all the characteristics disclosed at the beginning of this description and further characterized in that:
- said portion of the sealing and guiding gasket that extends along said door upright and inside the lower door structure comprises two separate portions:
  - an upper gasket portion, which extends along said door upright, and which is secured within a space defined between the door upright and said aesthetic panel of plastic material, and
  - a lower gasket portion, which is arranged within said lower door structure, and which is assembled within a channel element of plastic material mounted within said lower door structure,
- said channel element of plastic material has an upper end portion protruding above the upper end of said lower gasket portion, and having inclined inner surfaces configured to guide the insertion of the glass into said lower gasket portion during assembling of the door.

Studies and tests conducted by the Applicant have shown that the characteristics indicated above, first of all the division into two separate portions of the sealing and guiding gasket portion that extends along the door upright and inside the lower door structure, enables the assembling operation of the glass on the door to be greatly facilitated.

At the same time, the provision of the lower gasket portion within the aforesaid channel element of plastic material, provided at its upper end with inclined inner surfaces configured to guide the insertion of the glass into the aforesaid lower portion of the sealing and guiding gasket, ensures that the assembling operation can be performed with the certainty that the glass is arranged in the correct assembling position, which further simplifies and facilitates the assembling operation.

In the preferred embodiment, the guiding device according to the invention is also characterized in that:
- the upper end portion of the plastic channel element has a central wall and two opposite side walls,
- in the mounted condition of said channel element, said side walls are substantially parallel to the longitudinal vertical plane of the motor-vehicle,
- the aforesaid inclined inner surfaces are provided on the inner surfaces of said side walls, to locate the glass in position along the horizontal direction, transverse with respect to the longitudinal direction of the motor-vehicle, as well as on the inner surface of said central wall, to locate the glass in position with respect to the longitudinal direction of the motor-vehicle.

Also, in the case of the preferred embodiment, the aforesaid channel element of plastic material has a lower end with a stop surface, for engaging the lower end of the aforesaid lower gasket portion.

According to another characteristic of the present invention, the aforesaid at least two engagement elements carried by the inner surface of the glass are positioned and spaced apart from each other in such a way that each of them is either always engaged with said upper gasket portion, or is always in engagement with said lower gasket portion. In other words, neither of said engagement elements passes from the upper portion to the lower portion of the gasket, or vice versa, during the lowering and raising movements of the glass. This avoids any risk of an engagement element sticking against the upper end of the lower gasket portion, or against the lower end of the upper portion of the gasket during the movements of the glass.

DETAILED DESCRIPTION OF A PREFERRED EMBODIMENT

Figure 2:
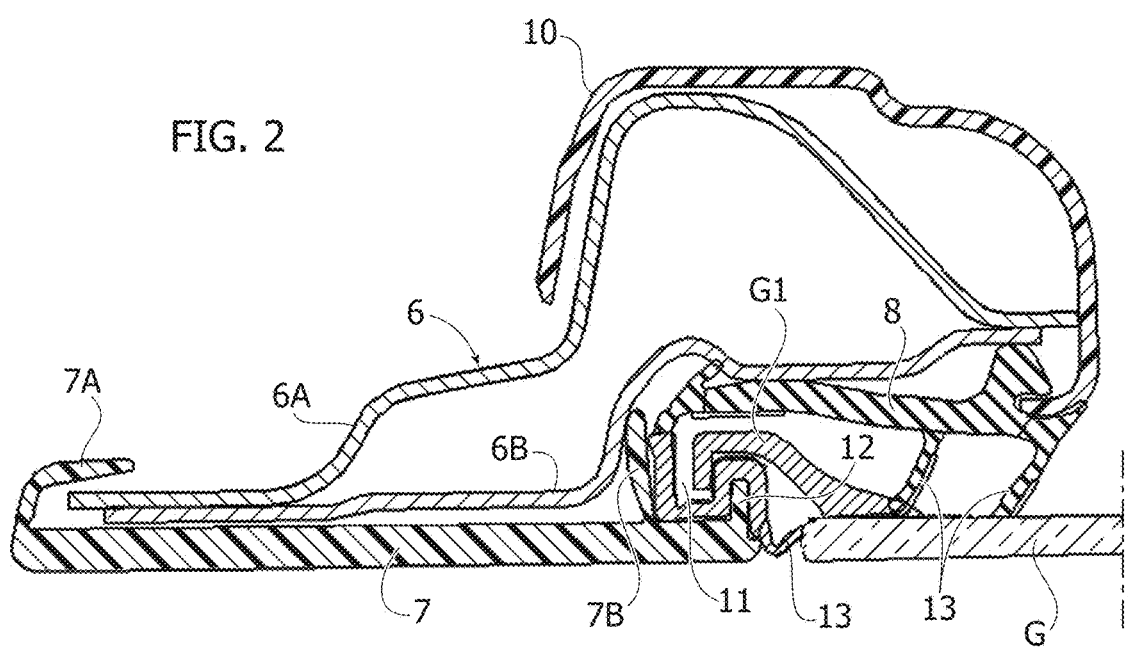
Figure 3:
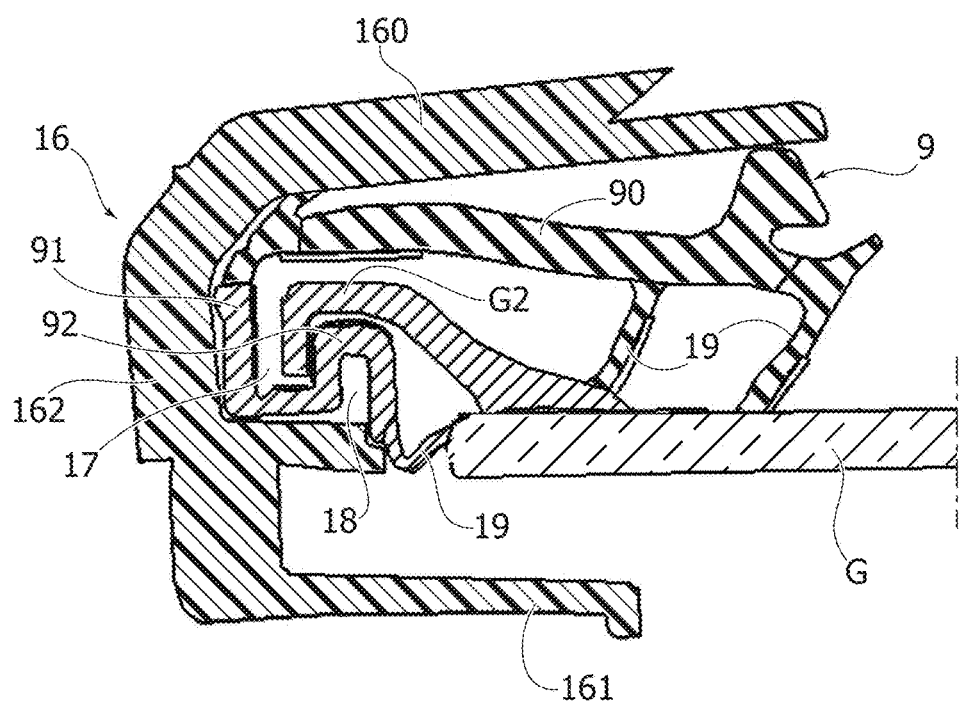
Figure 4:
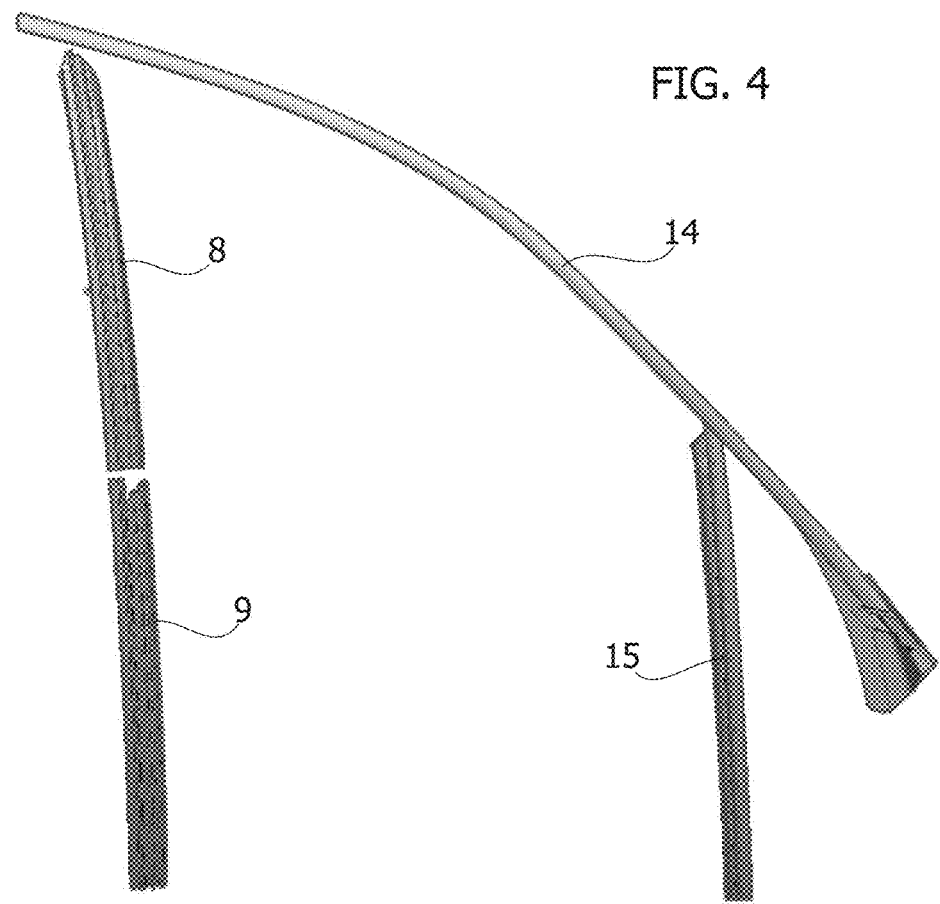
Figure 5:
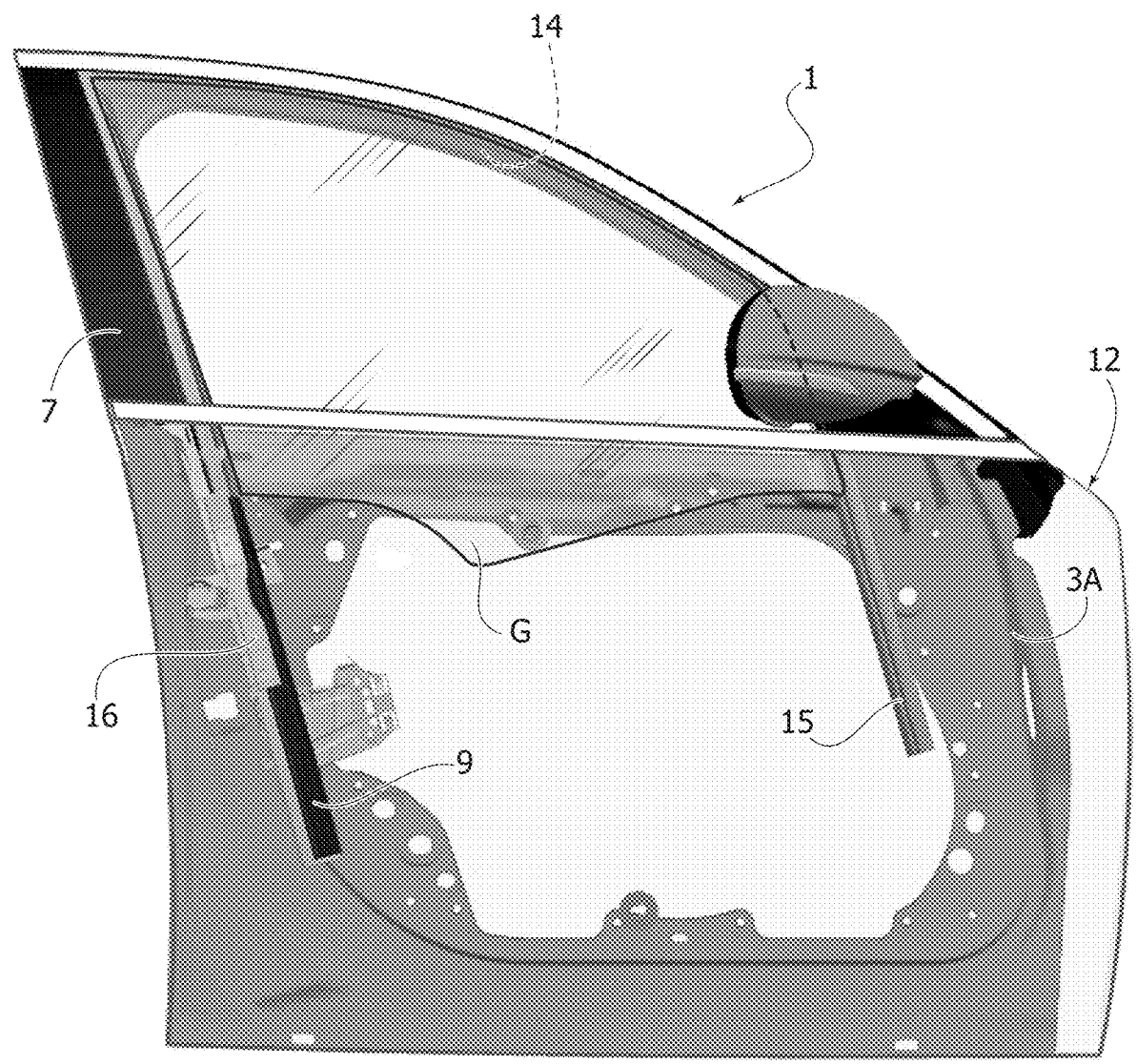
Figure 6:
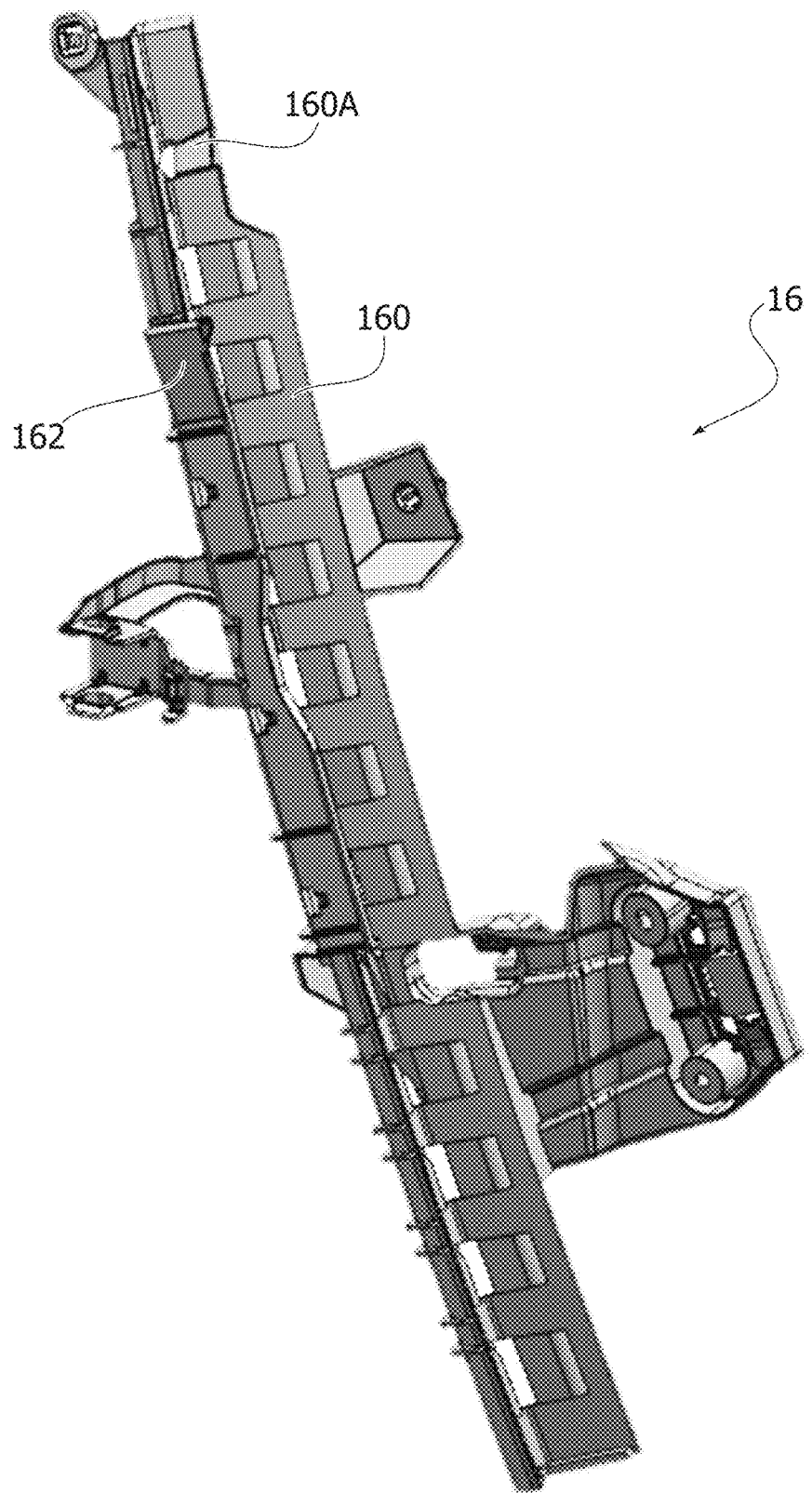
Figure 7:
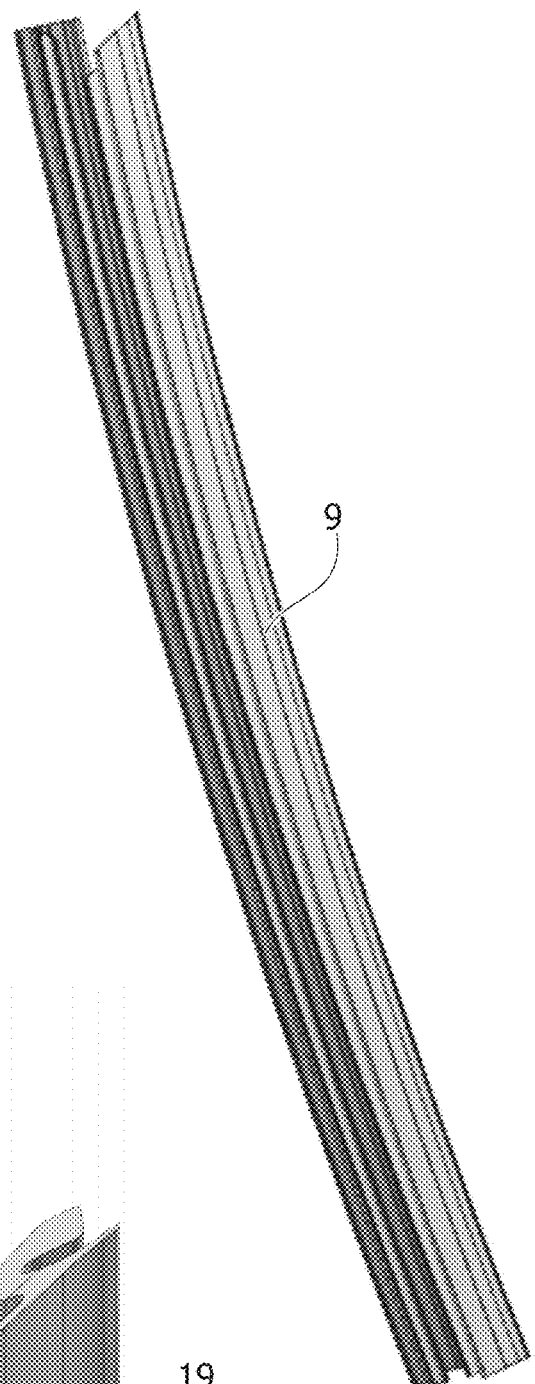
Figure 8:
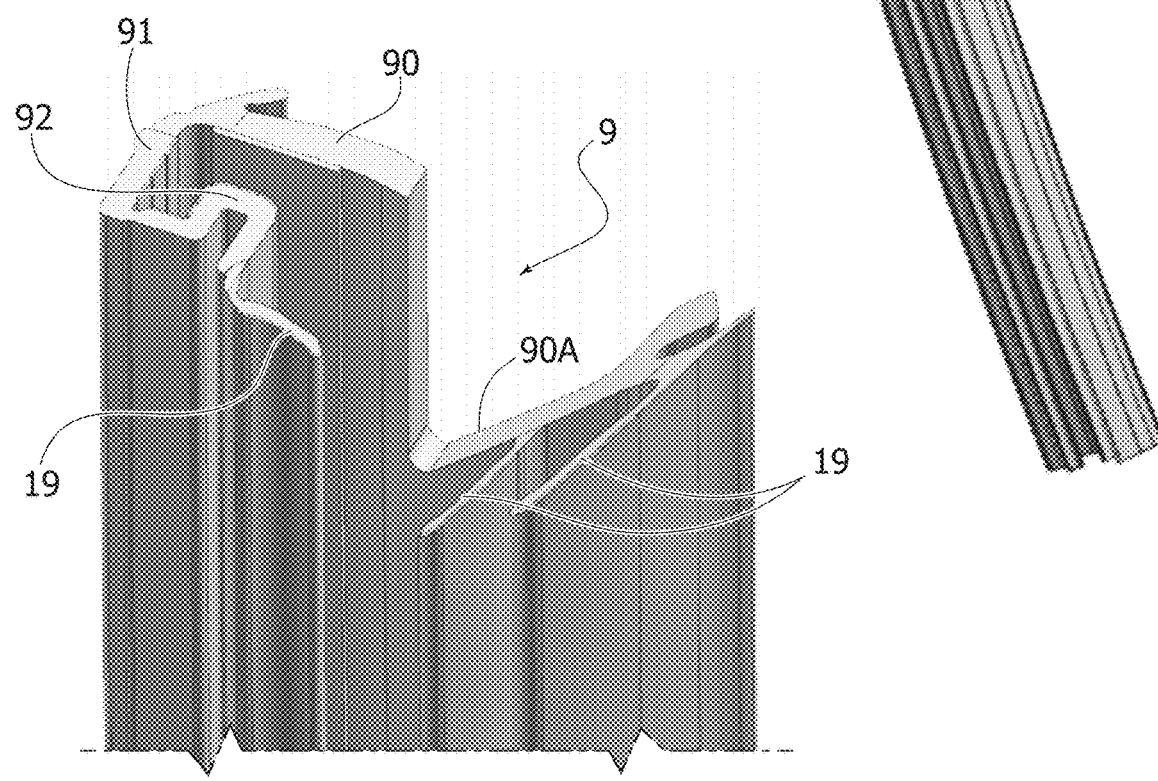
Figure 9:
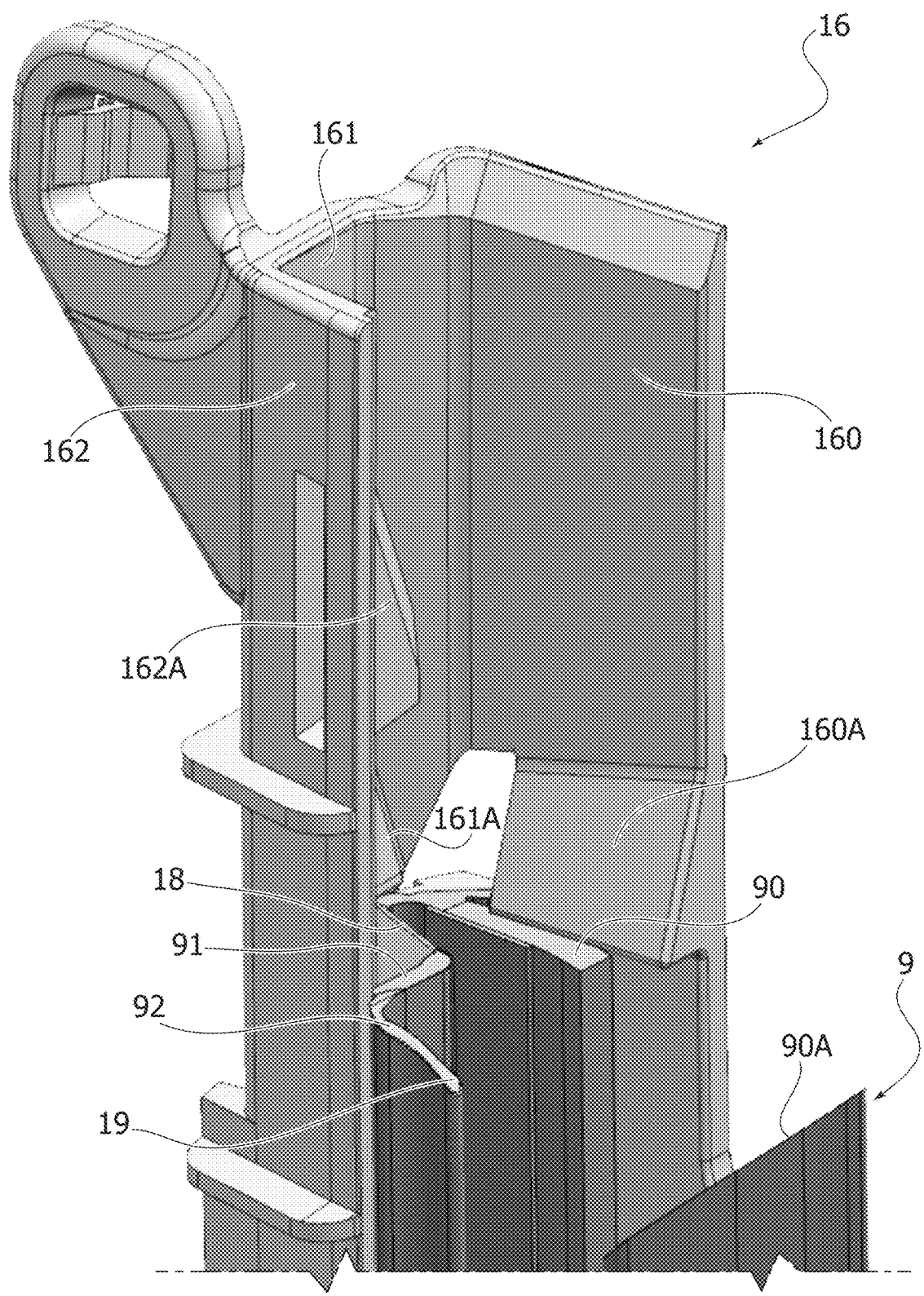
Figure 10:
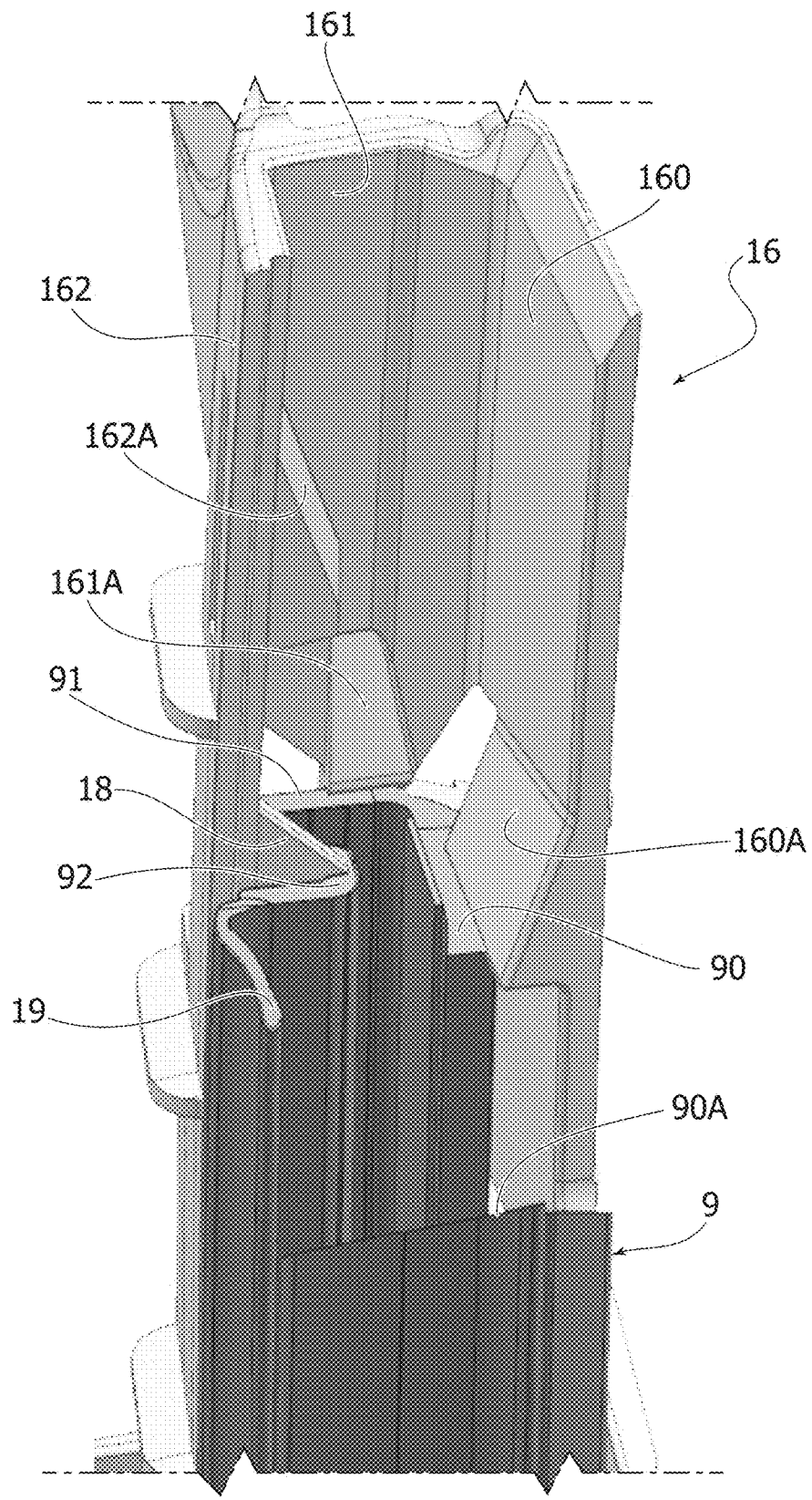
Figure 11:
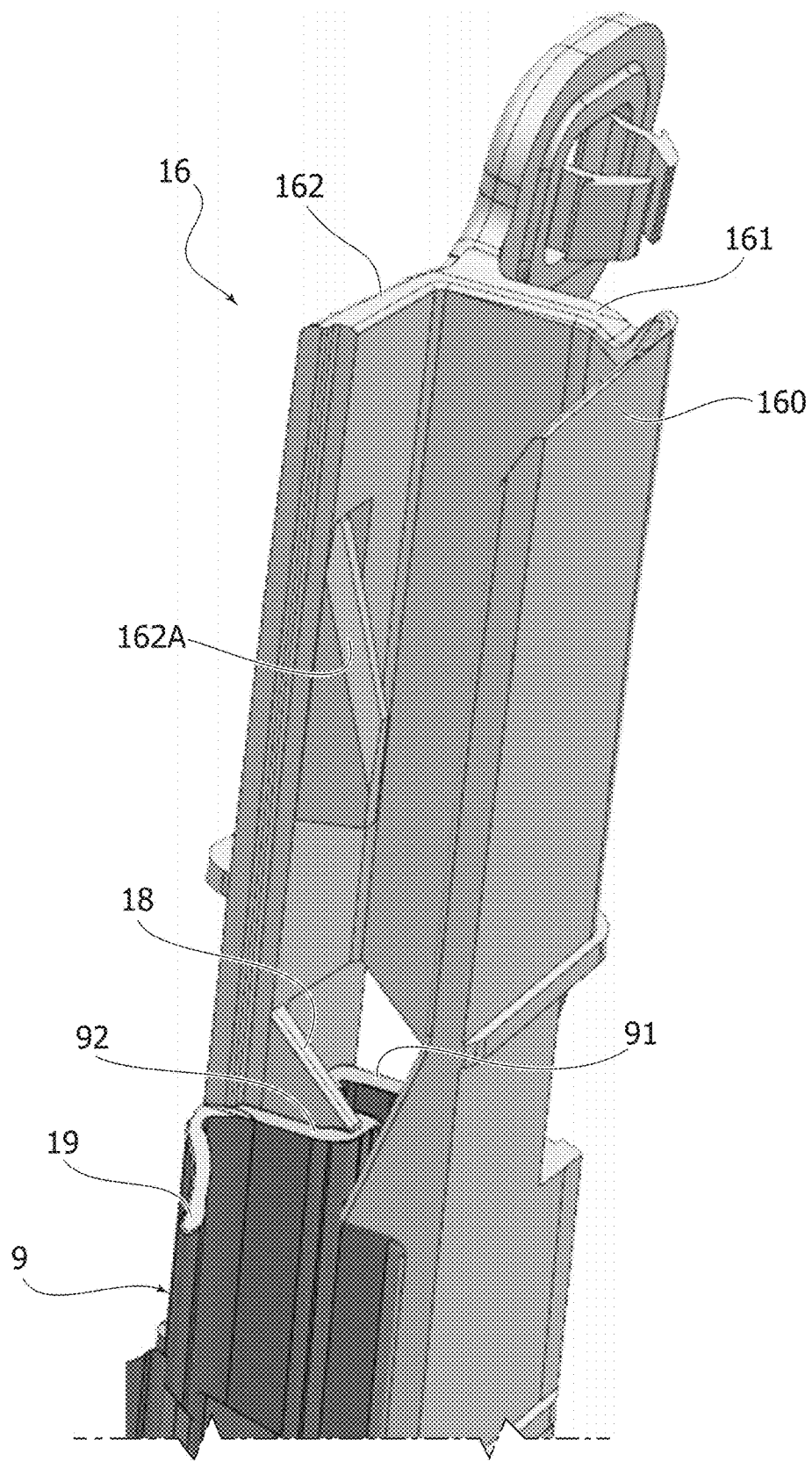
Figure 12:
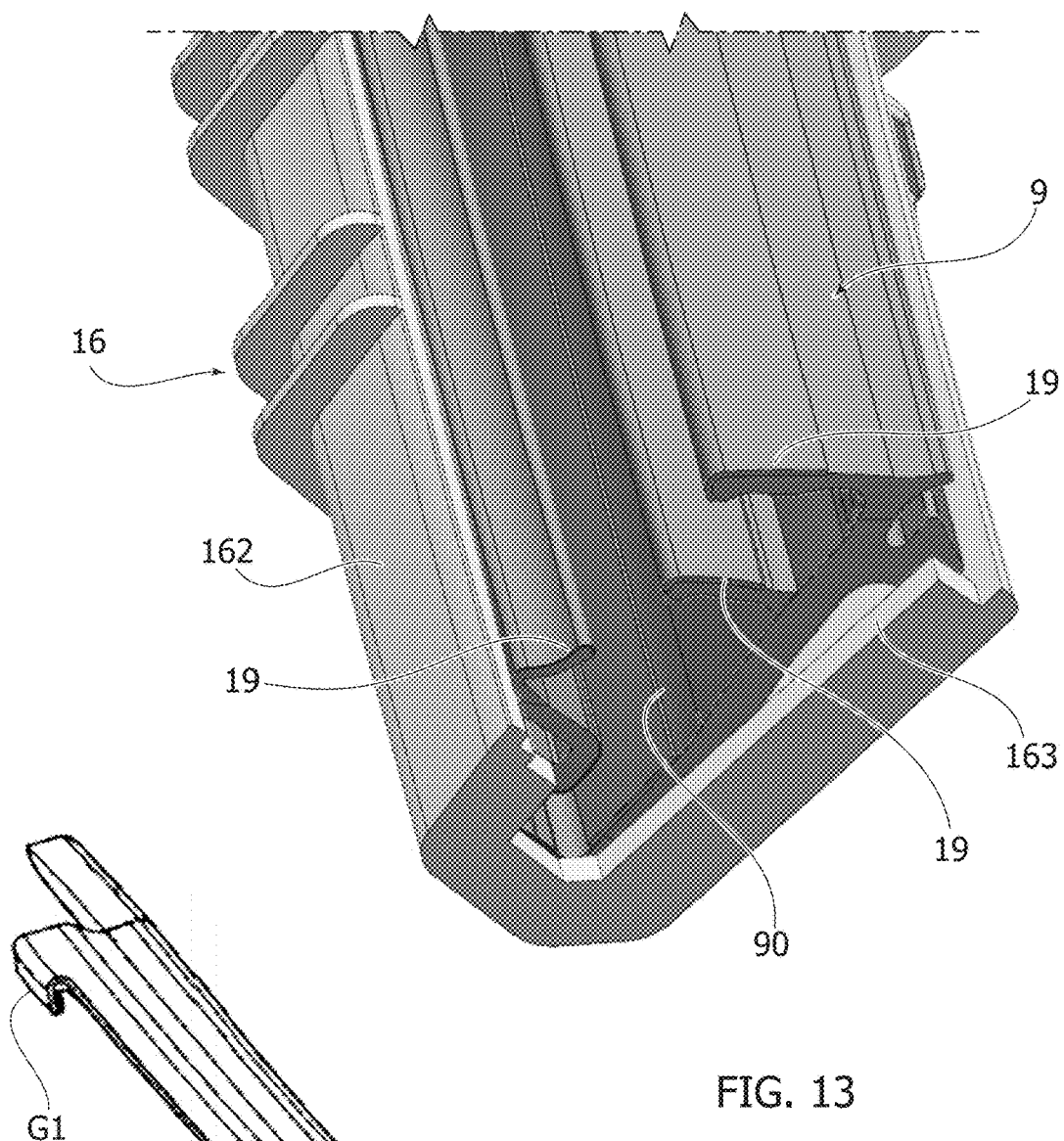
Figure 13:
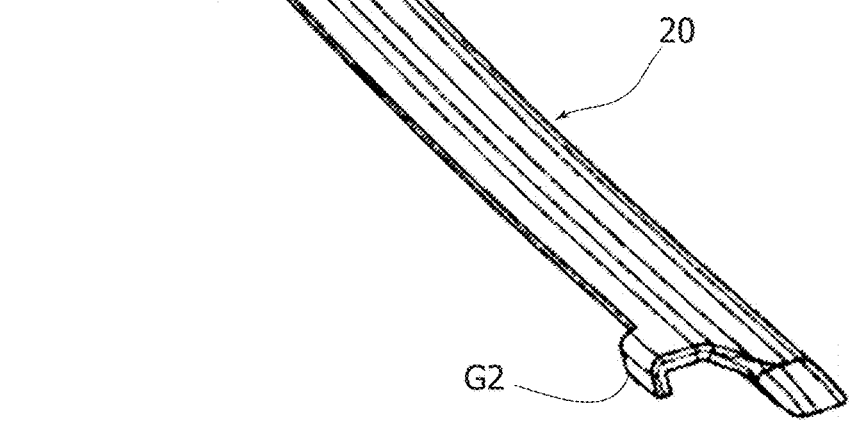
Figure 14:
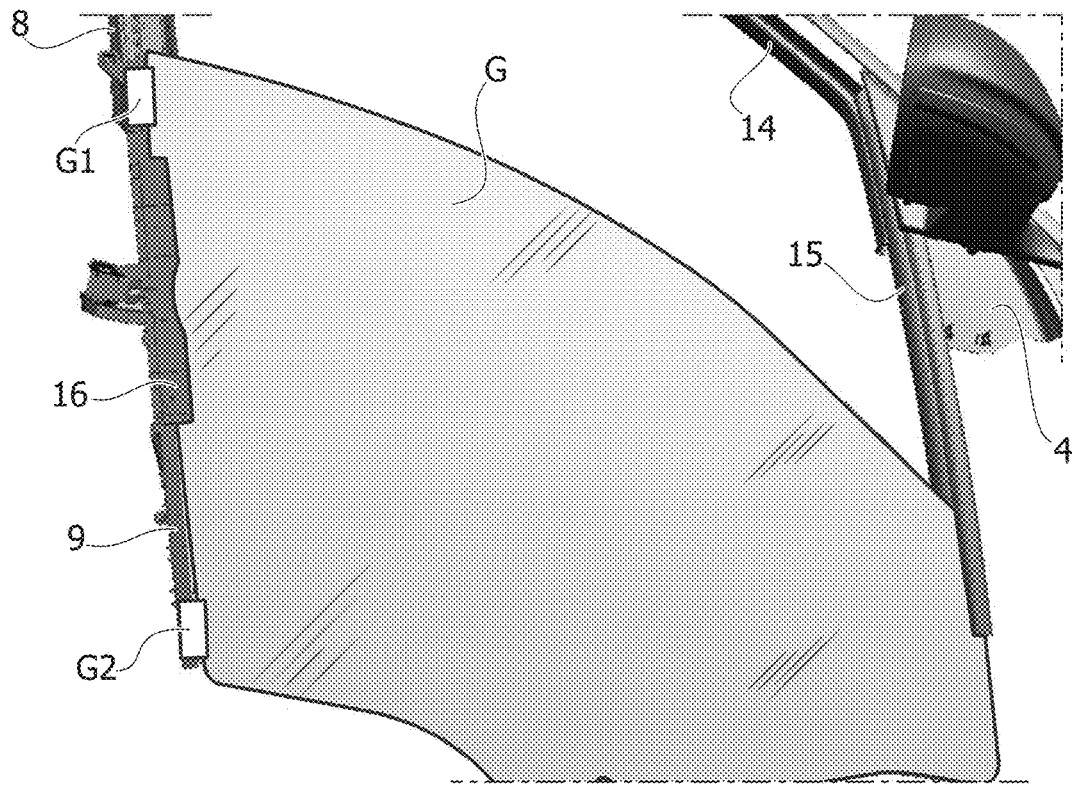
Figure 15:
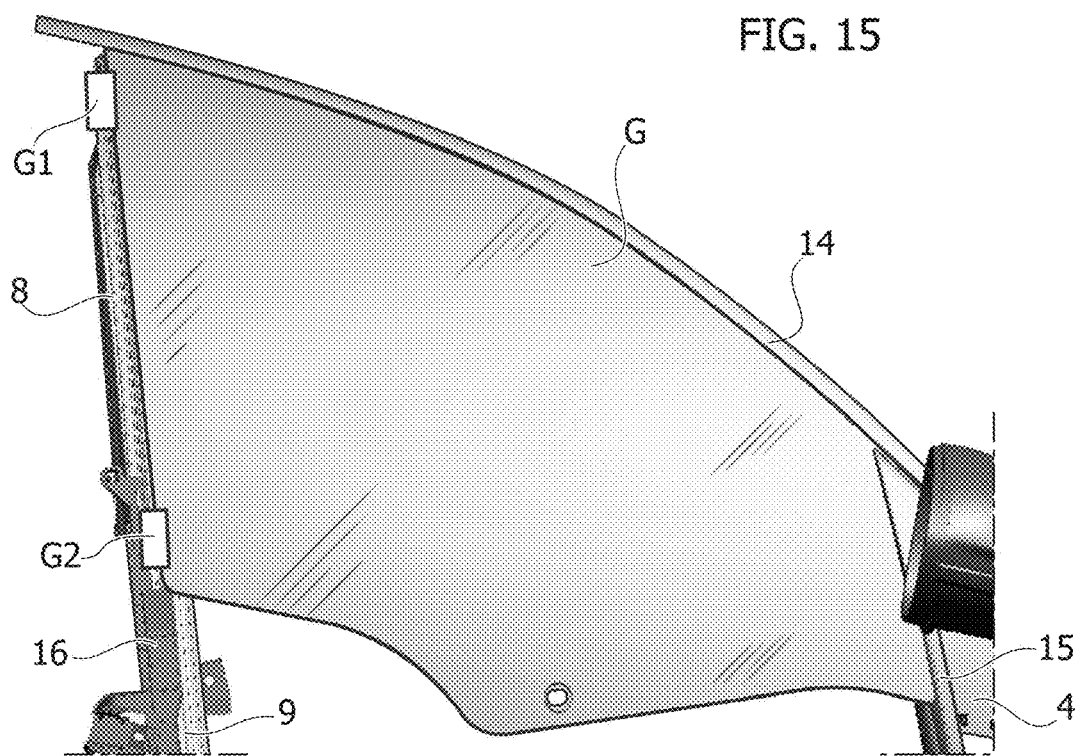

Further characteristics and advantages of the present invention will become apparent from the description that follows with reference to the attached drawings, provided purely by way of non-limiting example, wherein:

FIG. 1 illustrates an example of a front side door of a motor-vehicle,

FIG. 2 and FIG. 3 are cross-sectional views according to the cross-section lines II-II and III-III of FIG. 1, which show a preferred examplary embodiment of the guiding device according to the invention, FIG. 4 is a view that shows only the various portions of the sealing and guiding gasket associated with the door of FIG. 1, FIG. 5 is an additional view of the door, which shows the inner structure of the lower portion of the door, FIG. 6 is a perspective view on an enlarged scale of a channel element made of plastic material, which is arranged in the exemplary embodiment illustrated here to receive the lower portion of the sealing and guiding gasket that is associated with the rear vertical edge (with reference to the direction of travel) of the glass of the door, FIG. 7 is a perspective view of the aforesaid lower portion of the sealing and guiding gasket portion that cooperates with the rear vertical edge of the glass, FIG. 8 shows the detail of the upper end of the gasket portion illustrated in FIG. 7, in a perspective view and on an enlarged scale, FIG. 9 is a perspective view on an enlarged scale of the upper end of the plastic channel element of FIG. 6, with the lower gasket portion mounted therein, FIG. 10 is an additional perspective view of the detail of FIG. 9, FIG. 11 is yet another perspective view, according to a different direction, of the detail of FIGS. 9 and 10, FIG. 12 illustrates a perspective view on an enlarged scale of the lower end of the plastic channel element of FIG. 6, with the lower sealing gasket portion mounted therein, FIG. 13 shows an example of an embodiment of a profiled strip glued to the inner surface of the glass and carrying two engagement elements, spaced apart from each other, which are to cooperate, respectively, with the upper portion and with the lower portion of the sealing and guiding gasket, along the rear vertical edge of the glass, FIG. 14 is a partial view of the door, showing the glass in its lowered position in order to make it clear that in this position the upper engagement element nevertheless remains engaged within the upper portion of the sealing and guiding gasket, FIG. 15 is a view corresponding to that of FIG. 14, which shows the glass in its raised position, in order to make it clear that the lower engagement element carried by the inner surface of the glass nevertheless remains engaged within the lower portion of the sealing and guiding gasket.

Figure 16:
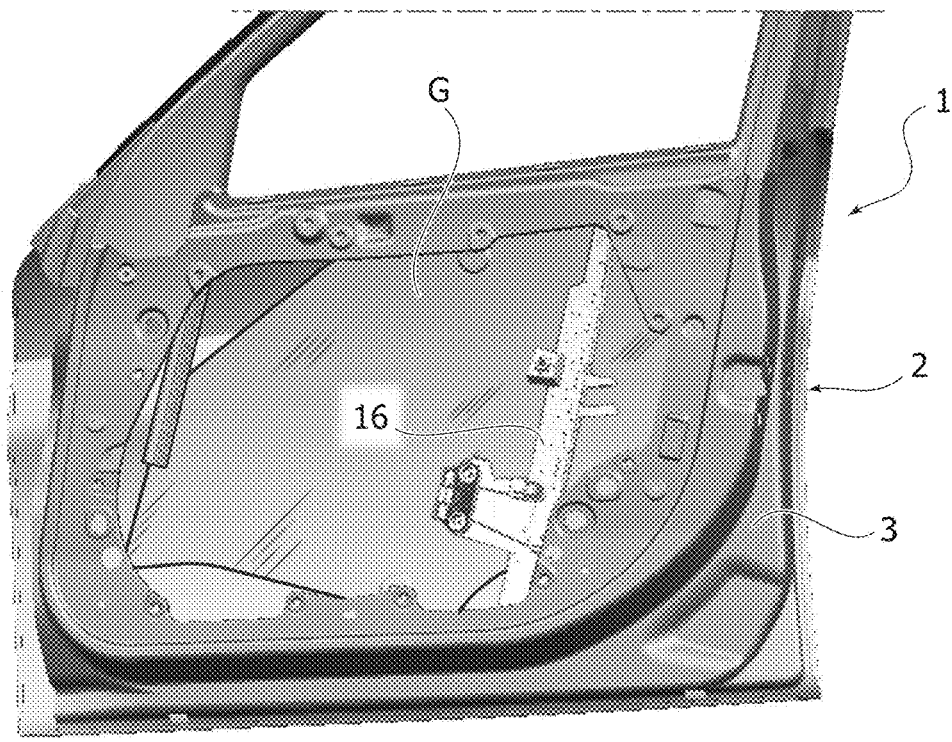
Figure 17:
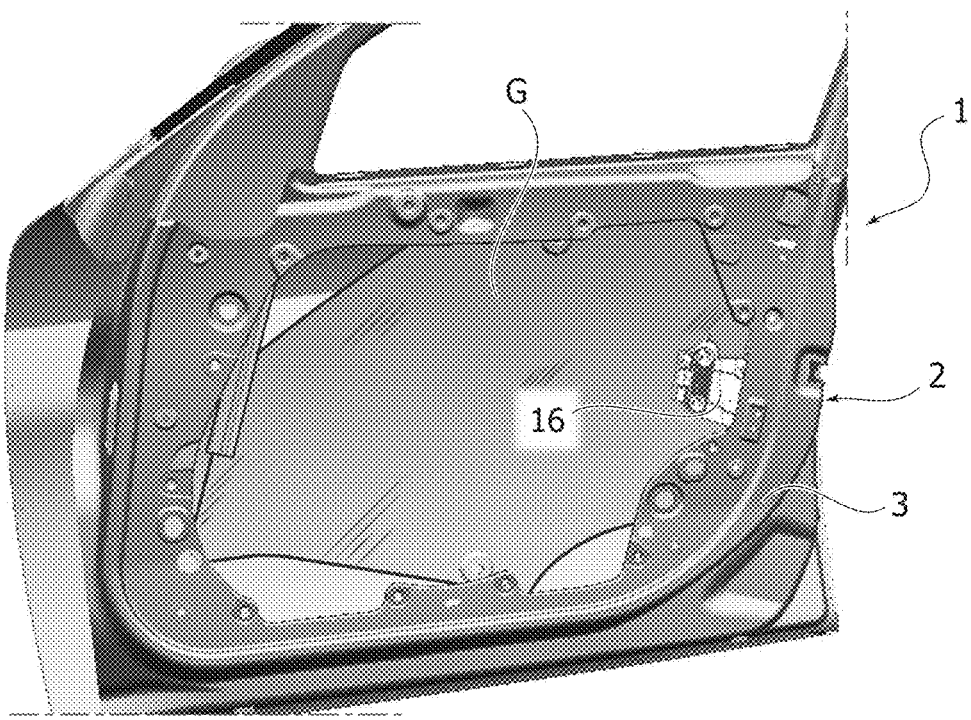
Figure 18:
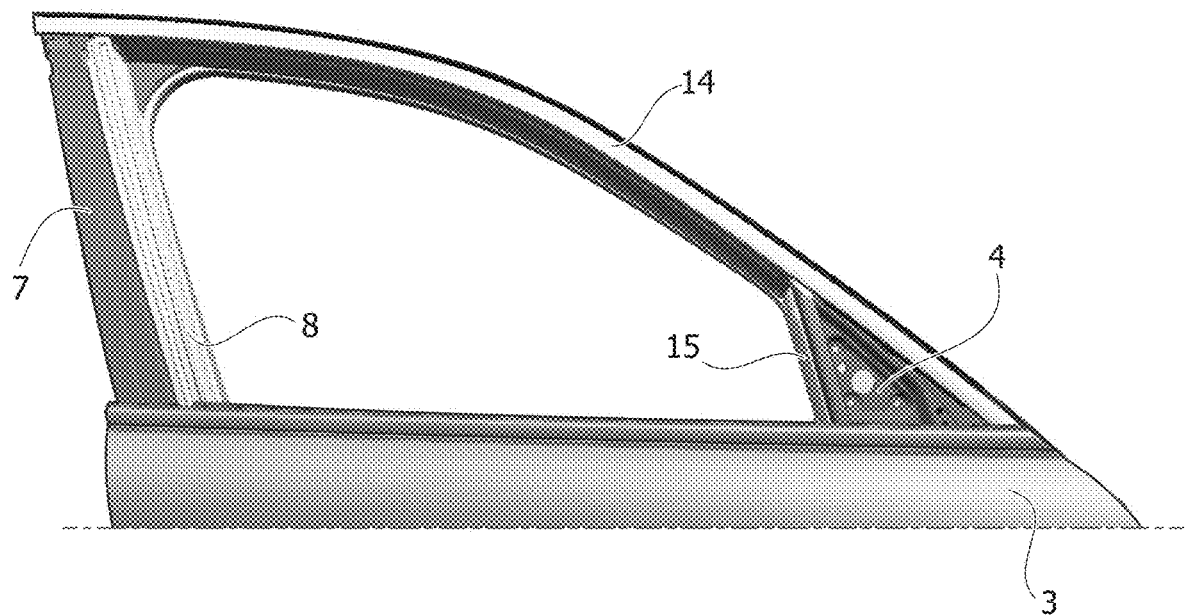
Figure 19:
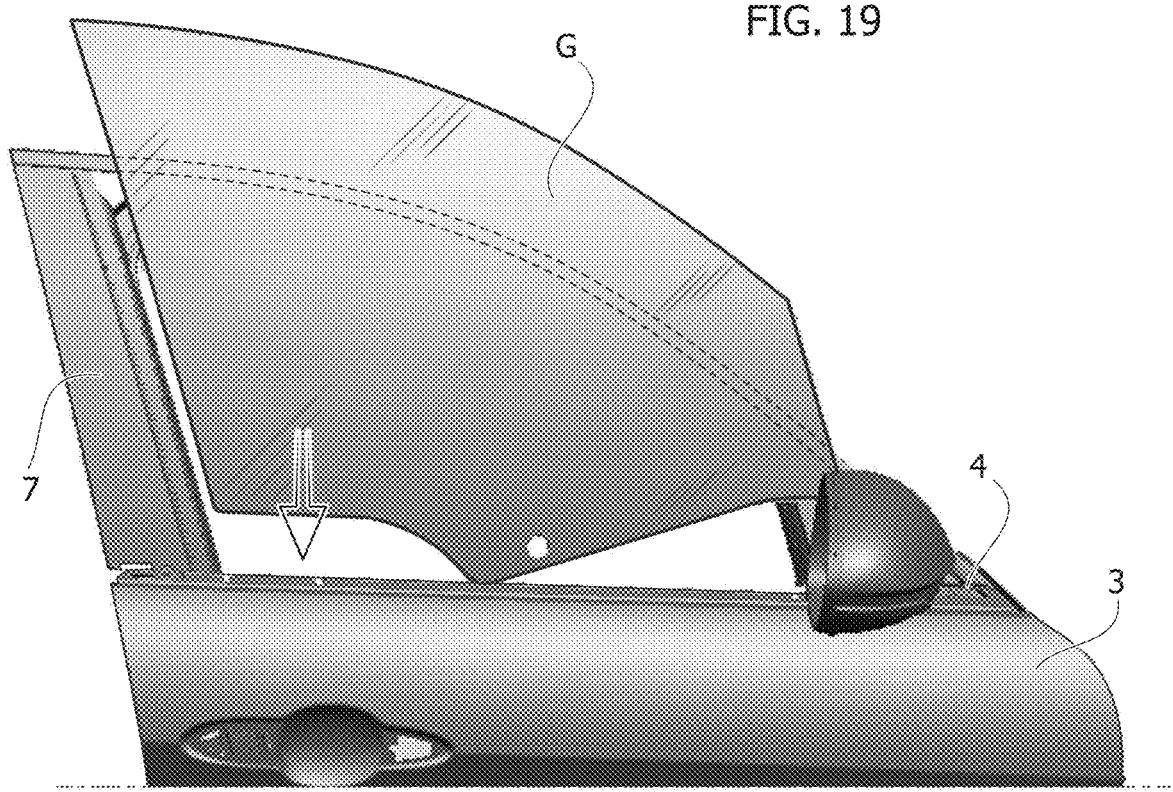
Figure 20:
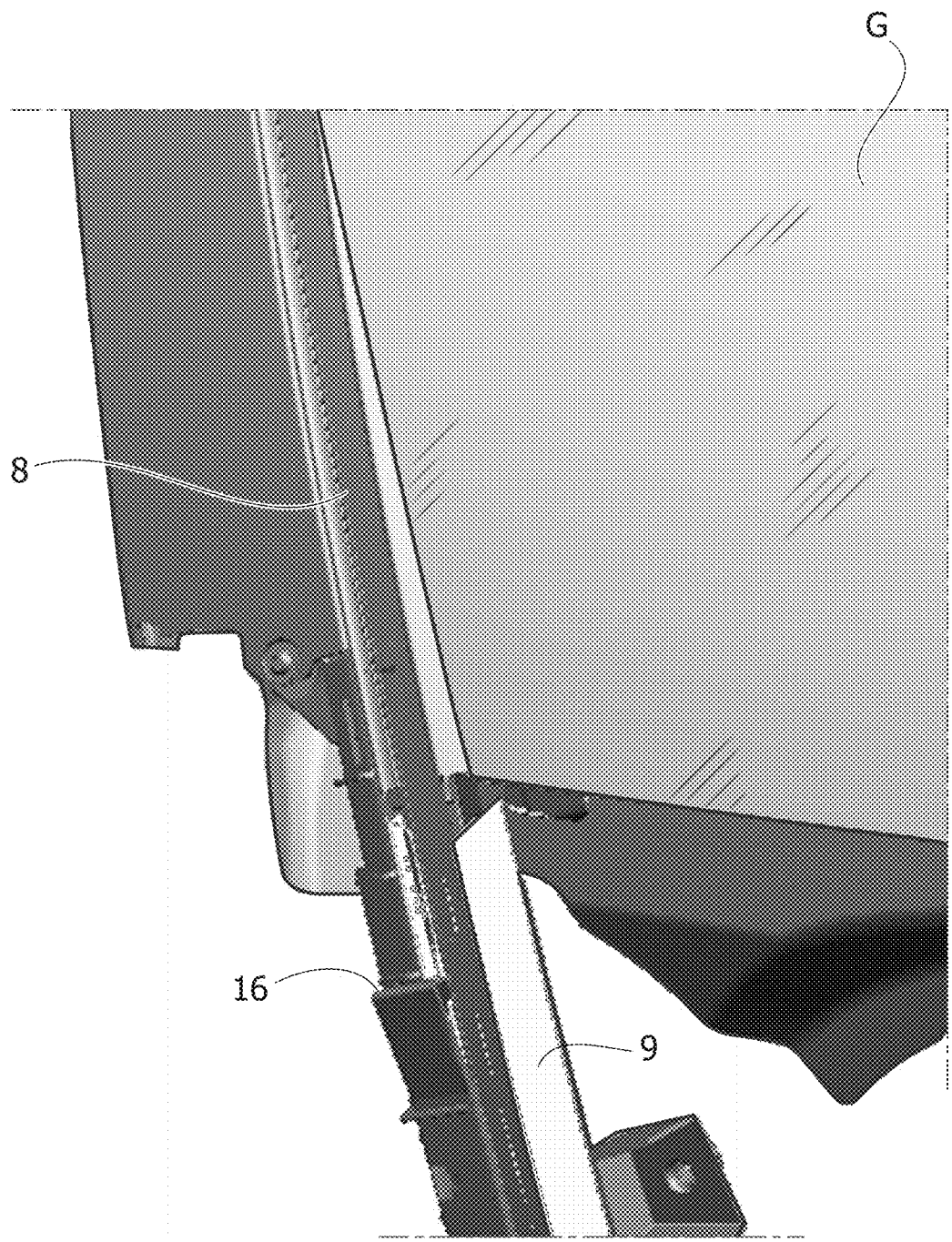

FIG. 16 is a view showing a step of the door assembling operation, wherein the channel element of plastic material illustrated in FIG. 6, carrying therein the lower gasket portion that is illustrated in FIG. 7, is assembled within the lower door frame, FIG. 17 shows a view corresponding to that of FIG. 16 in the condition wherein the aforesaid channel element of plastic material, with the lower portion of the sealing gasket mounted therein, is in its final assembling position within the lower structure of the door, FIG. 18 shows a step of the door assembling operation, wherein the portions of the sealing and guiding gasket that are associated with the upper frame of the door have been assembled on this frame, FIG. 19 shows a step wherein the glass of the door is inserted into the lower structure of the door, and FIG. 20 is a perspective view of a detail showing the engagement of the rear vertical edge of the glass within the lower portion of the sealing and guiding gasket, which is arranged within the aforesaid channel element of plastic material previously mounted within the lower structure of the door.

In the drawings, numeral 1 generally designates a front side door of a motor-vehicle, including a door structure 2. The door structure 2 comprises a lower door structure 3 and an upper frame 4 that defines a window opening 5. The upper frame 4 includes a front upright and a rear upright protruding upwards from the lower structure 3 of the door, and connected to each other by an upper element (in the example illustrated the front upright and the upper element of the frame 4 are defined by a single continuous curved element).

With reference also to FIG. 2, the rear upright of the upper frame 4 of the window is intended to be adjacent to a central pillar, or "B" pillar, forming part of the body of the motor-vehicle (and not illustrated here).

Still with reference to FIG. 2, the rear upright of the window frame 4, which is designated by reference number 6, is covered by an aesthetic panel of plastic material 7, which is hooked and/or glued to the sheet metal structure of the upright 6.

With reference, in particular, to FIG. 2, in the example illustrated, in accordance with a conventional technique, the upright 6, as well as the entire structure of the door, is defined by two sheet metal elements 6A, 6B welded together and defining the inner side and the outer side of the upright 6, respectively. The aesthetic panel of plastic material 7 is provided with appendices 7A, 7B, for mounting on the upright 6.

In the drawings, reference G generally designates a window glass that is slidably mounted vertically in the door structure, between a raised position, in which it closes the window opening 5, and a lowered position, in which it is received inside the lower structure 3 of the door.

In accordance with a conventional technique, a sealing and guiding gasket is mounted on the door structure, serving both to guide the front edge and the rear edge of the glass G during the vertical sliding movement of the glass, and to ensure sealing at the front edge, rear edge and upper edge of the glass G in the raised condition of the glass G.

According to the invention, the portion of the aforesaid sealing and guiding gasket that cooperates with the rear edge of the glass (in the present description and in the following claims, the terms "front" and "rear" are used with reference to the advancing direction of the motor-vehicle), and which extends along the rear upright 6 of the frame 4 and inside the lower structure 3 of the door, consists of two separate gasket portions. An upper gasket portion, visible in FIGS. 2 and 4 and designated by reference 8, and a lower gasket portion designated in the drawings by reference 9. The upper gasket portion 8 extends along the upright 6 of the upper frame 4 of the door, and is secured within a space defined between the upright 6 of the door and the aesthetic panel of plastic material 7. As can be seen in FIG. 2, the upper gasket portion 8 is also hooked onto an aesthetic element of plastic material 10.

Referring again to FIG. 2, the inner surface of the glass G carries (in the manner that will be described in detail below) a hook-shaped engagement element G1, which is slidably received within a groove 11 defined by a part of the upper portion 8 of the sealing gasket, which is mounted on an inner rib 12 of the aesthetic panel of plastic material 7.

According to a known technique, the arrangement of the engagement element G1 is such so that it keeps the glass G in a position in which the outer surface of the glass G is substantially flush with the outer surface of the aesthetic panel 7 of plastic material. The "flush" arrangement of the glass G is an aesthetic quality preferred by car designers.

During the vertical sliding of the glass G, the rear edge of the glass is, therefore, not guided directly into the upper portion 8 of the sealing gasket, but, through the engagement element G1, in order to obtain the aforesaid flush arrangement of the glass.

As can also be seen in FIG. 2, again in accordance with the prior art, the upper portion 8 of the sealing gasket has deformable lips 13, which engage the inner surface and the rear edge of the glass G, to ensure sealing against atmospheric agents, as well as to improve the silence inside the passenger compartment of the motor-vehicle, avoiding rustling air. In FIG. 2, the lips 13 are illustrated in their undeformed inoperative condition, but it is evident that these lips deform with respect to the position illustrated, following engagement with the glass G.

FIG. 4 of the attached drawings shows the upper portion 8, and the lower portion 9, of the part of the sealing and guiding gasket that cooperates with the rear edge of the glass G. This Figure also shows the portions 14 and 15 of the sealing gasket that cooperate, respectively, with the upper edge and with the front edge of the glass G.

The lower portion 9 of the sealing and guiding gasket, which cooperates with the rear edge of the glass G, is pre-assembled inside a channel element 16 made of plastic material (visible in perspective view in FIG. 6), which is then assembled, with the lower portion 9 of the sealing and guiding gasket inserted therein inside the lower structure 3 of the door, as visible in FIG. 5.

FIG. 5 shows the structure 2 of the door 1, including the inner sheet metal panel 3a forming part of the lower structure 3 of the door. FIG. 5 also shows the portions 14, 15 of the sealing and guiding gasket, which cooperate with the upper edge and with the front edge of the glass G (illustrated in its raised position), as well as the lower portion 9 of the sealing and guiding gasket, which cooperates with the rear edge of the glass G. FIG. 5 shows the mounting position of the plastic channel element 16, which internally supports the lower portion 9 of the portion of the gasket that cooperates with the rear edge of the glass G.

FIG. 7 shows a perspective view of the aforesaid lower portion 9 of the sealing and guiding gasket that cooperates with the rear edge of the glass, FIG. 3 shows the channel element 16 made of plastic material in cross-section, with the lower portion 9 of the sealing and guiding gasket mounted therein. The channel element 16 comprises an inner side wall 160, an outer side wall 161 and a central wall 162 that connects the side walls 160, 161 to each other. In the mounted condition on the motor-vehicle, the side walls 160, 161 are substantially parallel to the longitudinal vertical plane of the motor-vehicle, while the wall 162 is arranged in a vertical plane substantially transverse with respect to the longitudinal direction of the motor-vehicle. Like the upper portion 8 of the gasket, the lower portion 9 also has a groove 17 within which an element G2, carried by the inner surface of the glass G, is engaged. The groove 17 is defined by a portion of the lower portion 9 of the sealing gasket mounted above an inner rib 18 of the channel element 16. In this case as well, the lower portion 9 of the sealing and guiding gasket includes deformable lips 13, arranged to engage the rear edge and the inner surface of the glass G, illustrated in their undeformed condition in FIG. 3.

With reference to FIG. 13, the engagement elements G1, G2 are defined by teeth protruding from a profile strip of plastic material 20, glued to the inner surface of the glass G. The teeth G1, G2 are spaced apart from each other, and positioned in such a way that the tooth G1 is always engaged within the upper portion 8 of the portion of the sealing and guiding gasket that cooperates with the rear edge of the glass G, both when the glass is in its raised position and when the glass is in its lowered position, or in any intermediate position between said raised and lowered positions. The tooth G2 is arranged to be always engaged within the lower portion 9 of the portion of the sealing and guiding gasket, which cooperates with the rear edge of the glass G, both when the glass G is in its raised position and when it is in its lowered position, and when the glass G is in any intermediate position between said raised and lowered positions. This condition is clearly visible in FIGS. 14 and 15 of the attached drawings that show the glass in the lowered position and in the raised position, respectively.

The main advantage of the provision of the portion of the gasket that cooperates with the rear edge of the glass G in an upper portion 8, and in a lower portion 9, separated from each other, consists of a dramatic simplification of the operations for mounting the glass G on the door. In order to further facilitate the assembling operation, the channel element 16, within which the lower portion 9 of the gasket is pre-assembled, has an upper end portion thereof protruding above the upper end of the gasket portion 9 (see, in particular, FIGS. 9-11). At said upper end portion of the channel element 16, the side walls 160, 162 and the central wall 161 have inner surfaces including inclined surface portions 160A, 161A, 162A, which act as lead surfaces for the correct insertion of the lower-rear corner of the glass G during the assembly maneuver of the glass G in the door With reference again to FIGS. 3, 8 and 9-11, the lower portion 9 of the sealing gasket that cooperates with the rear edge of the glass G has a cross-section having a general C-shape, with an inner side wall 90, a central wall 91 and an outer side wall 92 which is engaged above the rib 18.

As can be seen in FIGS. 9-11, in the assembled condition of the lower portion 9 of the sealing gasket inside the plastic channel element 16, the inner side wall 90 of the gasket portion 9 is located adjacent to the inner side wall 160 of the channel element 16, and has its top surface adjacent to the lower end of the inclined surface 160A, in such a way that, during insertion of the glass G, the glass slides against the surface 160A until it fits correctly in the channel defined by the gasket portion 9. Similarly, the central wall 91 of the lower gasket portion 9 (FIG. 10) is adjacent to the central wall 161 of the channel element 16, and has its top surface adjacent to the lower end of the inclined surface 161A, in such a way that, during insertion of the glass G, the glass is guided until it correctly engages the channel defined by the lower gasket portion 9. Finally, the outer wall 92 of the lower gasket portion 9 is adjacent to the outer side wall 162 of the channel element 16 (FIG. 11). The side wall 162 has an inclined surface 162A, which guides the glass G during its downward insertion movement inside the channel element 16, so as to correctly engage it within the channel defined by the lower gasket portion 9.

As already indicated above, the lower portion 9 of the sealing gasket, which cooperates with the rear edge of the glass G, is pre-assembled within the channel element 16 before mounting of the channel element 16 within the lower structure 3 of the door. As is evident from the above description, the inclined surfaces 160A, 162A create the correct position reference of the glass with respect to the channel element 16, along a horizontal direction transverse with respect to the longitudinal direction of the motor-vehicle (with reference to the mounted condition on the motor-vehicle). At the same time, the inclined surface 161A refers the glass into the correct position with respect to the longitudinal direction of the motor-vehicle. Finally, the lower end surface of the lower gasket portion 9 abuts against a lower wall 163 (FIG. 12) of the channel element 16, so as to obtain a reference in the correct position of the lower gasket portion 9 within the channel element 16 with respect to the vertical direction.

FIGS. 16-20 show the different steps of the assembling of the various portions of the sealing gaskets within the structure of the door 1.

FIG. 16 shows the step wherein the channel element 16, inside which the lower gasket portion 9 has been previously assembled, is inside the lower structure 3 of the door.

FIG. 17 shows the final mounting condition of the channel element 16 within the lower structure 3 of the door.

FIG. 18 shows the final condition following a second step of the door assembly, wherein—on the upper frame 4 of the door structure—the upper portion 14 of the sealing gasket intended to cooperate with the upper edge of the glass is assembled, along with the front portion 15 of the sealing gasket intended to cooperate with the front edge of the glass, and the upper portion 8 of the gasket portion intended to cooperate with the rear edge of the glass.

Once the sealing and guiding gaskets of the glass G have been assembled as such, the glass G is inserted from above into the lower structure 3 of the door, engaging the rear-lower corner of the glass G within the upper end of the channel element 16 (20), in such a way that the inclined guide surfaces 160A, 161A, 162A, which have been described above (see FIGS. 9-11), favor the correct engagement of the glass within the lower portion 9 of the portion of the sealing gasket intended to cooperate with the rear edge of the glass.

With reference, in particular, to FIG. 8, the inner side wall 90 of the lower portion 9 of the sealing gasket has a recess 90A (which in the example illustrated has a V-shape), with a vertical rear side and an inclined front side ("rear" and "front" are always used here with reference to the advancing direction of the motor-vehicle), which makes the operation of inserting the glass G inside the lower portion 9 of the gasket even easier and simpler.

As is evident from the above description, the invention makes it possible to drastically simplify the assembling operations of the door and, in particular, to facilitate the operation of inserting the glass into the door, always ensuring the mounting of the glass in the correct position. This result is obtained by simple means, without any substantial impact on the complexity and cost of manufacturing (which actually benefits from an increase in productivity).

Naturally, without prejudice to the principle of the invention, the details of construction and the embodiments may vary widely with respect to those described and illustrated purely by way of example, without departing from the scope of the present invention.

What is claimed is:

1. A device for guiding a sliding glass of a motor-vehicle side door, comprising
    a door structure, including a lower door structure and an upper door frame defining a window opening,
    the upper door frame including a door upright which is to be adjacent to a central pillar of a motor-vehicle,
    a sealing and guiding gasket guiding said sliding glass, secured to said door structure, and having a portion extending along said door upright and inside said lower door structure,
    an aesthetic panel of plastic material, secured to said door upright, on an outer side thereof,
    the sliding glass slidably mounted vertically in the door structure between a closed raised position in which said sliding glass closes the window opening and a lowered position in which the sliding glass is received within the lower door structure,
    wherein the sliding glass has an inner surface carrying at least two spaced apart engagement elements that are slidably engaged within said sealing and guiding gasket, in such a way that in the raised position of the sliding glass, said sliding glass has its outer surface flush with the outer surface of said aesthetic panel of plastic material,
    wherein: said portion of the sealing and guiding gasket that extends along said door upright and inside the lower door structure comprises two separate portions comprising:
        an upper gasket portion, which extends along said door upright, and which is secured within a space defined between the door upright and said aesthetic panel of plastic material, and
        a lower gasket portion, which is arranged within said lower door structure, and which is assembled within a channel element of plastic material mounted within said lower door structure,
    said channel element of plastic material has an upper end portion protruding above an upper end of said lower gasket portion, and has inclined inner projections configured to guide the insertion of the sliding glass into said lower gasket portion during assembling of the motor-vehicle side door, and wherein:
    the upper end portion of the channel element of plastic material has a central wall connecting two opposite side walls, said two opposite side walls substantially parallel to a longitudinal vertical plane of the motor-vehicle, and said central wall substantially perpendicular to a longitudinal plane of the motor-vehicle,
    said inclined inner projections are projecting from inner surfaces of the central wall and the two opposite side walls, wherein:
        a first inclined inner projection of said inclined inner projections is provided on a first inner surface of an inner wall of the two opposite side walls and a second inclined inner projection of said inclined inner projections is provided on a second inner surface of an outer wall of the two opposite side walls to locate the sliding glass in position along a horizontal direction, transverse with respect to the longitudinal vertical direction of the motor-vehicle, and
        a third inclined inner projection of said inclined inner projections is provided on a third inner surface of the central wall to locate the sliding glass in position with respect to the longitudinal direction of the motor-vehicle, and wherein:

when the lower gasket portion is assembled within the channel element of plastic material, a first inner gasket wall of the lower gasket portion is adjacent to the inner wall, and has a top surface substantially adjacent and situated alongside to a first lower end of the first inclined inner projection, in such a way that, during insertion of the sliding glass into said lower gasket portion, the sliding glass slides against the first inclined inner projection until the sliding glass fits in a channel defined by the lower gasket portion, a second inner gasket wall of the lower gasket portion is adjacent to the outer wall of the channel element of plastic material, and having a top surface spaced vertically from a second lower end of the second inclined inner projection, and adapted to guide the sliding glass during a downward insertion movement of the sliding glass inside the channel element of plastic material, so as to engage the sliding glass within the channel defined by the lower gasket portion, and a third inner gasket wall of the lower gasket portion is adjacent to the central wall of the channel element of plastic material, and having a inner projection to a third lower end of the third inclined inner projection, in such a way that, during insertion of the sliding glass into said lower gasket portion, the sliding glass is guided until the sliding glass engages the channel defined by the lower gasket portion, the third inclined inner surface vertically aligned with the first inclined inner projection.

2. A guiding device according to claim 1, wherein:
the top surface of the first inner gasket wall comprises a first portion and a second portion, the first portion adjacent to the lower end of the first inclined inner projection, and the second portion having a recess comprising, with reference to an advancing direction of the motor-vehicle, a vertical rear side and an inclined front side.

3. A guiding device according to claim 1, wherein the channel element of plastic material has a lower end with a stop surface for engaging a lower end of the aforesaid lower gasket portion, to locate the lower gasket portion in the vertical position with respect to the channel element of plastic material.

4. A guiding device according to claim 1, wherein said at least two engagement elements carried by the inner surface of the sliding glass are spaced apart from each other, and positioned in such a way that each of them is always engaged either with said upper gasket portion or with said lower gasket portion, respectively.

* * * * *

UNITED STATES PATENT AND TRADEMARK OFFICE
CERTIFICATE OF CORRECTION

| | |
|---|---|
| PATENT NO. | : 11,801,734 B2 |
| APPLICATION NO. | : 17/480597 |
| DATED | : October 31, 2023 |
| INVENTOR(S) | : Galluccio et al. |

It is certified that error appears in the above-identified patent and that said Letters Patent is hereby corrected as shown below:

In the Claims

Column 8 Line 19: Claim 1, Delete "inner surface" and insert -- inner projection --

Column 9 Line 25: Claim 1, Delete "a inner projection to" and insert -- a top surface substantially adjacent and situated alongside to --

Signed and Sealed this
Fifth Day of December, 2023

Katherine Kelly Vidal
*Director of the United States Patent and Trademark Office*